UNITED STATES PATENT OFFICE.

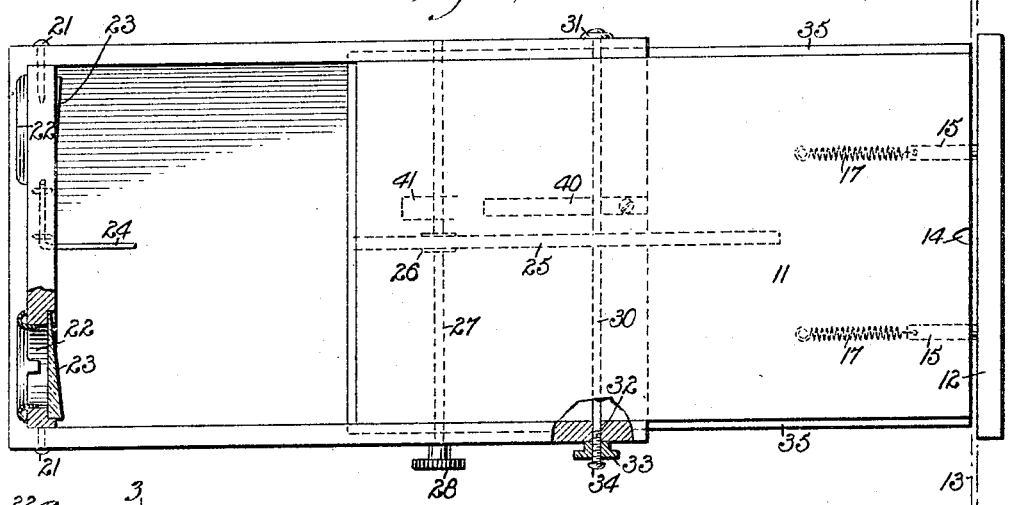
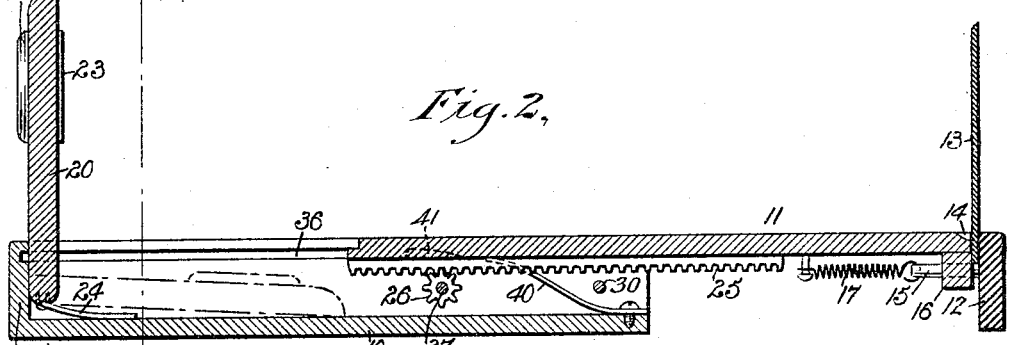
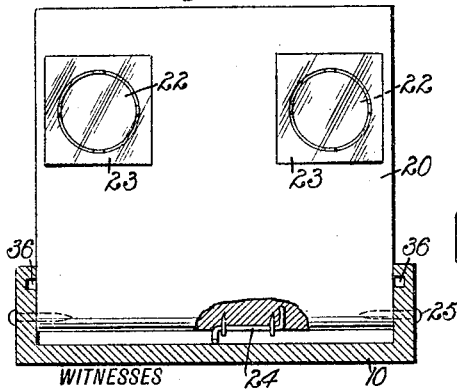
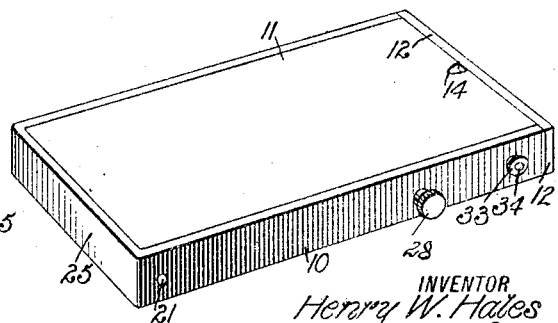

HENRY W. HALES, OF RIDGEWOOD, NEW JERSEY.

STEREOSCOPE.

1,230,705.  Specification of Letters Patent.  Patented June 19, 1917.

Application filed October 31, 1916. Serial No. 128,680.

*To all whom it may concern:*

Be it known that I, HENRY W. HALES, a citizen of the United States, and a resident of Ridgewood, in the county of Bergen and State of New Jersey, have invented a new and Improved Stereoscope, of which the following is a full, clear, and exact description.

The ordinary stereoscopes now in general use are excellent instruments but are exceedingly bulky and clumsy and when not in use are always exposed to dust and dirt and also more or less in the way. It is also difficult to use different thicknesses of views or pictures in them. The focusing is not easy, and there is no arrangement for clamping the instrument when the correct focus has been obtained. The object of this invention is to overcome these defects and to make a more portable and universal instrument and one that is particularly adapted for the use of commercial salesmen to show to prospective customers pictures of the merchandise they have to sell, as its extreme compactness allows it to be carried readily in the pocket. There are other advantages also which will appear from the following description.

In order to accomplish the desired result, use is made of a box having a slidable cover provided at its outer end with means for supporting a stereoscopic picture, and a lens carrier pivoted in the forward end of the box, the lens carrier in one position extending vertically and with the lenses a distance above the box to permit of viewing the stereoscopic picture held on the cover, and the said lens carrier in another position extending within the box below the cover.

A practical embodiment of the invention is represented in the accompanying drawings forming a part of this specification, in which similar characters of reference indicate corresponding parts in all the views.

Figure 1 is a plan view of the stereoscope with parts in extended position ready for use, parts being shown in section;

Fig. 2 is a sectional side elevation of the same;

Fig. 3 is a cross section of the same on the line 3—3 of Fig. 2; and

Fig. 4 is a reduced perspective view of the stereoscope with the parts in folded position.

A rectangular and somewhat shallow box 10 is provided with a slidable cover 11 provided on the top near its rear end with a transversely extending spring-pressed clamping member 12 for clamping the lower edge of a stereoscopic picture 13 against the rear end of the cover to support the stereoscopic picture on the said slidable cover, as plainly indicated in Fig. 2. The top of the cover 11 is provided at its middle adjacent the member 12 with a centering notch 14 to permit of correctly centering the stereoscopic picture 13 on top of the cover 11 by sliding the said picture transversely until the middle of the picture is in register with the notch 14. The clamping member 12 is provided with guide pins 15 mounted to slide lengthwise of the cover 11 in suitable bearings 16 attached to or formed on the under side of the said cover 11, and the forward ends of the guide pins 15 are connected with springs 17 fastened to the under side of the cover 11. By the arrangement described the clamping member 12 can be moved rearward against the tension of the springs 17 to allow of inserting and clamping a stereoscopic picture 13 of any desired thickness, it being understood that the pressure of the springs 17 hold the clamping member 12 in firm clamping contact with the back of the lower portion of the picture 13. The clamping member 12 is adapted to close the rear end of the box 10 at the time the cover 11 is moved into closed position, as shown in Fig. 4. The guide pins 15 serve as a rest and stop for the lower edge of the stereoscopic picture and hold the latter in correct position for viewing purposes.

In the forward end of the box 10 is pivoted a lens carrier 20 by the use of pivots or trunnions 21 engaging the sides of the box 10, and the lens carrier 20 is preferably in the form of a plate and is provided with viewing apertures 22 covered at the rear by the usual stereoscopic lenses 23. The lens carrier 20 is pressed on at its pivotal end by a spring 24 having one end attached to the carrier and the other end resting on the upper face of the bottom of the box 10, so that the spring 24 tends to swing the lens carrier 20 upward from folded position within the box (see dotted lines in Fig. 2) into a vertical position, as shown in full lines in Figs. 1, 2, and 3, and with the lower face portion of the carrier 20 abutting against the end 25 of the box 10, thus limiting the swinging movement of the carrier 20 and holding the same in vertical position with the lenses 23 the correct distance above the box for properly viewing the stereoscopic picture 13. In order to obtain the proper focus for the observer, the cover 11 is moved outward or inward until the correct focus is obtained, and for this purpose use is preferably made of a rack 25 attached to the under side of the cover 11 and in mesh with a pinion 26 secured on a transverse shaft 27 journaled in the sides of the box 10. One end of the shaft 27 is provided with a suitable knob or handle 28 to permit the user to conveniently turn the shaft 27 with a view to cause the pinion 26 to impart a forward or backward movement to the rack 27 and the cover 11 according to the direction in which the knob or handle 28 is turned at the time.

In order to hold the cover 11 in an adjusted position, use is made of a clamping rod 30 extending through the sides of the box 10 near the rear thereof, and this clamping rod 30 is provided at one end with a head 31 resting against the outer face of one of the box sides. The other end 32 of the clamping rod 30 is provided with screw threads on which screws a nut 33, preferably in the form of a milled head adapted to abut against the outer face of the other box side so that when the nut 33 is screwed up the sides are drawn together sufficiently to clamp the cover 11 in the adjusted position. The clamping rod 30 is provided next the screw threads with a head 34 to limit the outward screwing of the nut 33 thus preventing the nut from being completely unscrewed from the clamping rod 30 and lost. It is understood that when the nut 33 is screwed outward until it abuts against the head 34 then the box sides are released and the cover 11 is free to slide in and out of the box 10.

In practice, the sides of the cover 11 are preferably provided with tongues 35 engaging grooves 36 formed in the inner faces of the sides of the box 10 to insure a proper sliding of the cover 11 on the box body. A spring 40 is attached to the upper side of the bottom of the box body 10 and bears with its free end against the under side of the cover 11 so as to hold the latter in any adjusted position it may be moved to for focusing purposes by the user of the stereoscope. The free end of the spring 40 is adapted to engage a shoulder 41 formed on the under side of the cover 11 near the forward end thereof to limit the outward sliding movement of the cover 11 on the box 10 thus preventing the cover from becoming accidentally detached from the box body. When it is desired, however, to remove the cover 11 it is only necessary for the operator to press the spring 40 sufficiently downward to clear the shoulder 41 to allow of pulling the cover 11 out of the box 10.

When the stereoscope is not in use, the lens carrier 20 is swung downward into the box 10 and the cover 11 is then moved into closed position so that the lens carrier 20 is confined within the box 10, and when the cover 11 is moved out into open position the lens carrier 20 is swung upward into vertical extended position by the action of its spring 24. Thus the stereoscope is immediately ready for use, it being necessary only to insert the picture 13 between the rear end of the cover 11 and its clamping member 12 and to then move the cover 11 in or out by turning the knob 28 correspondingly until the correct focus is obtained.

The stereoscope shown and described is very simple and durable in construction, and composed of comparatively few parts not liable to get easily out of order.

Having thus described my invention, I claim as new and desire to secure by Letters Patent:—

1. A stereoscope, comprising a box having a slidable cover provided at its rear end with a transversely extending clamping member adapted to close the rear end of the box and to clamp the lower portion of a stereoscopic picture against the rear end of the cover.

2. A stereoscope, comprising a box having a slidable cover provided at the under side adjacent the rear end with bearings, a clamping member provided with guide pins slidable in the said bearings, the said clamping member being adapted to coact with the rear end of the cover to clamp a stereoscopic picture between them, and springs attached to the under side of the cover and connected with the said guide pins.

3. A stereoscope, comprising a box having a slidable cover provided at its outer end with means for supporting a stereoscopic picture, a lens carrier pivoted in the forward end of the box, the lens carrier in one position extending vertically and with the lenses a distance above the box, and in another position extending within the box below the cover, the under side of the box cover being provided near its forward end with a shoulder, and a spring secured to the bottom of the box and having its free end bearing against the under side of the cover on moving the cover inward or outward for focusing purposes to hold the cover in the adjusted position, the terminal of the spring being adapted to abut against the said shoulder to limit the outward movement of the cover.

4. A stereoscope, comprising a box having a slidable cover provided at its rear end with a transversely extending clamping member adapted to close the rear end of the box and to clamp the lower portion of a stereoscopic picture against the rear end of the cover, the top of the cover being provided at its middle with a centering notch adjacent the said clamping member to permit of centering the stereoscopic picture, and a lens carrier supporting lenses and located on the other end of the box.

HENRY W. HALES.

Copies of this patent may be obtained for five cents each, by addressing the "Commissioner of Patents, Washington, D. C."